United States Patent

[11] 3,588,647

| [72] | Inventor | Jack B. Harwell<br>Euless, Tex. |
|---|---|---|
| [21] | Appl. No. | 725,247 |
| [22] | Filed | Apr. 1, 1968 |
| [45] | Patented | June 28, 1971 |
| [73] | Assignee | Electronic Control Corporation<br>Euless, Tex. |

[54] AC POWER CONTROL CIRCUITS FOR REACTIVE POWER LOADS
13 Claims, 5 Drawing Figs.

[52] U.S. Cl. .................................................. 318/227, 318/230, 318/345
[51] Int. Cl. .................................................. H02p 5/40
[50] Field of Search ........................................ 318/227, 230, 345

[56] References Cited
UNITED STATES PATENTS

| 3,353,078 | 11/1967 | Maynard | 318/227 |
| 3,389,315 | 6/1968 | Andreas et al. | 318/227X |
| 3,403,314 | 9/1968 | Maynard | 318/227 |
| 3,403,315 | 9/1968 | Maynard | 318/227 |

OTHER REFERENCES
AC MOTOR SPEED CONTROL, HOME APPLIANCE BUILDER, August 1964 (pp. 13— 15, 38)

Primary Examiner—Oris L. Rader
Assistant Examiner—Gene Z. Rubinson
Attorney—Robert C. Peterson ABSTRACT: An AC power control circuit for reactive loads and various motors including a phase control trigger circuit for actuating a power control switch wherein the trigger circuit timing impedance is varied in accordance with an impedance varying element reactive in a motor feedback circuit.

INVENTOR:
JACK B. HARWELL
BY Robert C. Paterson
ATTORNEY.

INVENTOR:
JACK B. HARWELL
BY Robert C Peterson
ATTORNEY.

3,588,647

AC POWER CONTROL CIRCUITS FOR REACTIVE POWER LOADS

BACKGROUND OF THE INVENTION

1. Field of Invention

This invention relates to power control circuits and more particularly to timing circuits in power control circuits wherein a motor feedback circuit controls an impedance varying element whereby power is applied to a motor responsive to the motor load.

2. Description of the Prior Art

Various power control circuits have been devised in the past using many types of semiconductors and other solid state devices. Typically the silicon controlled rectifier has been utilized in such circuits.

Most power control circuits have utilized certain basic concepts. Each has a timing circuit for actuating the power control switch to apply power across the load. The timing circuit was essentially an RC circuit using a variable resistor to change the conduction angle of the power control switch, and consequently, determine the duration of the power cycle. The conduction angle could be varied by changing the potentiometer resistor setting.

Unfortunately, the prior art failed to provide for an automatic increase in power responsive to the load demand in full wave AC circuits. Thus, whenever the load demand varied the power control switch remained operative to apply load power only during the preset interval. This deficiency remained until the invention described herein.

INVENTION SUMMARY

Applicant's invention affords a thertofore unavialable power control circuit whereby any increase in AC power load provides a feedback responsive to effect and increase in the conduction angle of a bilateral solid state power control device and thereby increase the average load power. The invention utilizes a feedback circuit which includes an impedance varying element or device that reacts to feedback current to vary the impedance in the timing circuit of the motor speed control. The invention is equally applicable to both universal motors and induction motors. Likewise, the invention is applicable to any power control system. Typically, the impedance varying element or device (Impedance Element) may be any one of a number of different devices, for example, any bilateral control device or switch, inverse parallel SCR's, bilateral amplifying devices, and current gain device. Other specific devices of the aforementioned types are disclosed in the following U.S. Pat. Nos. 3,317,746; 3,275,909; 3,274,463 and 2,769,926. Moreover, the primary requirement for the Impedance Element is that its impedance must vary responsive to feedback, whereupon in a motor control circuit the conduction angle for the power control switch is advanced or retarded as required to increase or decrease load power.

MOreover, the Impedance Element may be characterized as a reactive or active element that, under the feedback conditions of current from a motor in a power control circuit, will vary the impedance in the timing circuit whereby the conduction angle will be advanced or retarded responsive to the power load to control the load power.

It is therefore an object of the invention to provide a power control circuit with a feedback mechanism whereupon the load power may automatically be compensated for varying power load;

Another object of the invention is to provide a power control circuit wherein the timing circuit includes an Impedance Element responsive to variation in power load to advance or retard the conduction angle of the power control switch to control load power;

Another further object of the invention is to provide a power control circuit with feedback means whereupon the speed of the motor may be maintained at a desired rate regardless of the motor load;

Another further object of the invention is to provide a motor power control circuit wherein the timing circuit includes an active Impedance Element responsive to a component of motor load power whereby such Impedance Element effects advancement or retardation of the conduction angle of the motor power control switch;

Another further object of the invention is to provide a power control circuit having power line compensation with a compatible feedback mechanism whereupon the load power may automatically be compensated for not only power line fluxuations, but also varying power load; and Another further object of the invention is to provide a motor power control circuit having power line compensation wherein a compatible timing circuit includes an Impedance Element responsive to a component of motor load power whereby such Impedance Element effects advancement or retardation of the conduction angle of the motor power control circuit.

DRAWING DESCRIPTION

PREFERRED EMBODIMENTS

Initially, it will be understood that the invention is applicable to both the so called universal motor and the induction motor. The power control circuit for each type motor is somewhat different, however, the inventive concept remains that is motor feedback is utilized to advance or retard the conduction or firing angle of the power control circuit.

Figure 1:
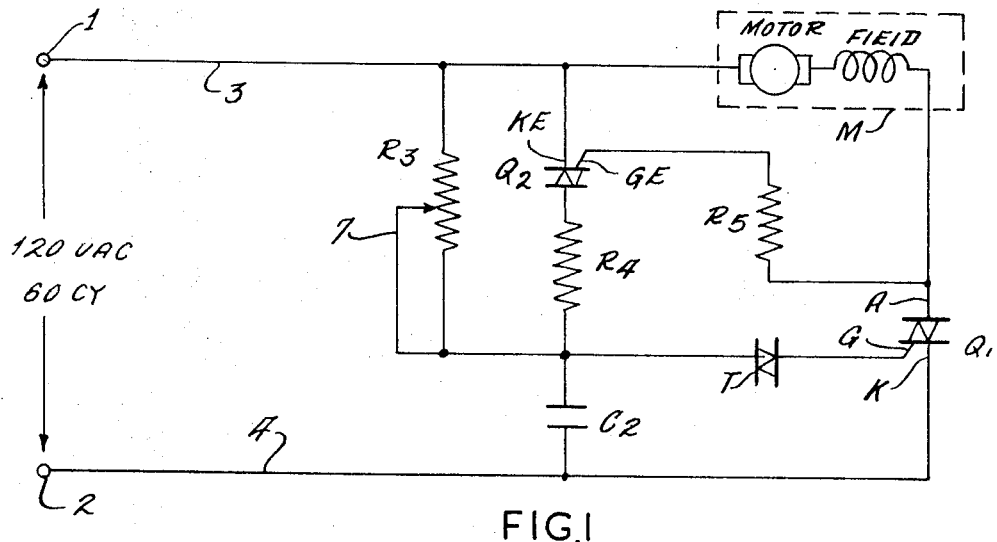
FIG. 1 illustrates a simple circuit embodiment of the invention as applied to a universal AC-DC motor.

Referring now to the drawings and particularly FIG. 1, the circuit comprises a pair of terminals 1 and 2 provided on lines 3 and 4, respectively, and may be suitably connected to a 120 volt AC power line. A universal motor M is connected on one side to line 3 and is connected on the other side by line 5 to the anode A of bilateral power control switch $Q_1$. The cathode K of power switch $Q_1$ is connected to line 4. The timing control for power switch $Q_1$ comprises potentiometer resistor $R_3$ in parallel with the series circuit of resistor $R_4$ and impedance varying device or element (Impedance Element) $Q_2$. The Impedance Element $Q_2$, as illustrated, is simply a bilateral solid state switch similar to power switch $Q_1$. The anode AE of Impedance Element $Q_2$ is connected to one side of resistor $R_4$; the cathode KE of Impedance Element $Q_2$ is connected to line 3. Resistor $R_3$ is connected at its fixed end to the juncture of line 3, one side of motor M and cathode KE of impedance Element $Q_2$. The wiper arm 7 of resistor $R_3$ and floating end of resistor $R_3$ are connected together and to the other side of resistor $R_4$ at the juncture of resistor $R_4$ and one side of timing capacitor $c_2$. The other side of capacitor $C_2$ is connected to line 4. The juncture of timing capacitor $C_2$ and resistor $R_4$ is coupled to the control electrode G of power switch $Q_1$ by bilateral trigger diode T.

The control electrode GE of Impedance Element $Q_2$ is coupled through feedback resistor $R_5$ to the anode A of power switch $Q_1$. In this manner resistor $R_5$ in series with the impedance appearing between control electrode GE and cathode KE of Impedance Element $Q_2$ forms a parallel circuit with motor M, hence, the voltage across motor M appears across the series circuit of resistor $R_5$ and the control electrode GE to cathode KE impedance of Impedance Element $Q_2$.

In operation, potentiometer resistor $R_3$, resistor $R_4$ and Impedance Element $Q_2$ provides the charging impedance of timing capacitor $C_2$. The wiper arm 7 of resistor $R_3$ is set for some initial speed for motor M. As motor M becomes loaded down and tends to decrease in speed, the current change is reflected as an increase in current between the control electrode GE and cathode KE of Impedance Element $Q_2$, and as a consequence, the impedance between cathode KE and anode AE decreases. This impedance decrease across Impedance Element $Q_2$ increases the charging rate of timing capacitor $C_2$ which reaches the firing voltage to trigger bilateral diode T at a faster rate thereby advancing the conduction or firing angle of power control switch $Q_1$, and in turn increasing the load power supplied to motor M, consequently maintaining the speed thereof. Furthermore, as the motor load decreases, the current between the cathode KE and control electrode GE decreases permitting the impedance across Impedance Element $Q_2$ to increase. This increase in impedance across Impedance Element $Q_2$ decreases the charging rate of timing capacitor $C_2$, and consequently, retards the conduction angle of power control switch $Q_1$.

From the foregoing, it will be appreciated that the feedback reactive device, Impedance Element $Q_2$ is in the charging impedance network for timing capacitor $C_2$; consequently, the voltage which capacitor $C_2$ charges toward varies depending upon current feedback appearing as a result of motor load variations.

Figure 2:
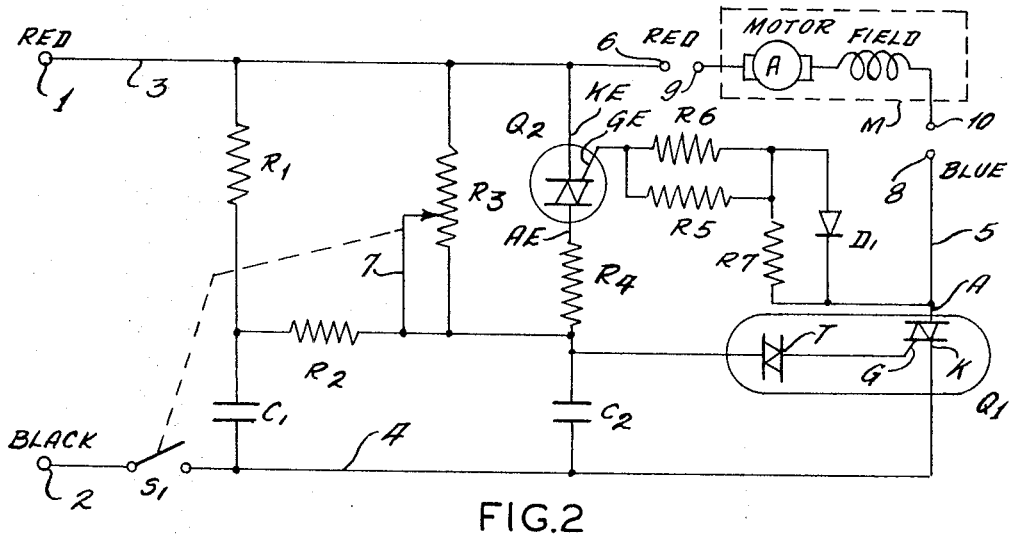
FIG. 2 illustrates a more advanced circuit embodiment of the invention than in FIG. 1, again as applied to a universal motor.

The circuit illustrated in FIG. 2 is an actual prototype circuit used to control the power of a universal motor. In more detail, the circuit includes contact 1 connected to line 3 and contact 2 connected to line 4 through a switch $S_1$. Contacts 1 and 2 provide suitable means to couple the circuit to a source of AC line power (typically 120 volts, 60 cycles). Resistor $R_1$ and capacitor $C_1$ in series across lines 3 and 4 provide a phase shift in the timing circuit. The timing circuit includes potentiometer resistor $R_3$ having a wiper arm 7 which is ganged with switch $S_1$. The fixed end of resistor $R_3$ is connected to line 3. The floating end of resistor $R_3$ and wiper arm 7 are connected together. A resistor $R_2$ couples the juncture of capacitor $C_1$ and resistor $R_1$ to the common connection of resistor $R_3$, resistor $R_4$ and timing capacitor $C_2$. The free end of capacitor $C_2$ is connected to line 4. The other end of resistor $R_4$ is connected to the anode AE of Impedance Element $Q_2$ (the same as depicted in FIG. 1 and others). The cathode KE of Impedance Element $Q_2$ is connected to line 3.

The bilateral solid state power switch $Q_1$ includes its cathode K, anode A and control electrode G together with bilateral trigger diode T connected to control electrode G, all as a unit. The free end of trigger diode T is coupled to timing capacitor $C_2$ at the common connection with resistor $R_4$. The cathode K is connected to line 4, and anode A is connected to line 5. Line 3 has contact 6 and line 5 has contact 8. A universal motor M is coupled by its contacts 9 and 10 to contacts 6 and 8 of lines 3 and 5. Thus, motor M is in the anode A circuit of power switch $Q_1$.

The feedback circuit coupling Impedance Element $Q_2$ and anode A of power switch $Q_1$ includes feedback resistor $R_7$ and matching diode $D_1$ in parallel coupled in series with the parallel combination or resistors $R_5$ and $R_6$ (resistors $R_5$ and $R_6$ may be replaced by a single resistor). Resistor $R_7$ and diode $D_1$ are connected to anode A of power switch $Q_1$ and resistor $R_5$ and $R_6$ are coupled to control electrode GE of Impedance Element $Q_2$.

The component used in the circuit of FIG. 2 to control the universal motor M (Dayton universal motor, listed in the well known Grainger Cat. No. 2M144) are listed hereafter:

$R_1$ resistor, carbon, 47 K 10 percent ½ watt
$R_2$ resistor, carbon, 18 K 10 percent ½ watt
$R_3$ potentiometer, carbon, 250 K 30 percent 2 watt
$R_4$ resistor, carbon, 10 K 10 percent ½ watt
$R_5$ resistor, carbon, 5.6 K 10 percent 2 watt
$R_6$ resistor, carbon, 6.8 K 10 percent 2 watt
$R_7$ resistor, carbon, 5.6 K 10 percent ½ watt
$D_1$ diode, silicon, 200 v. PIV
$C_1$ capacitor, paper, 0.1 uf 20 percent 200 v.
$C_2$ capacitor, paper, 0.1 uf 20 percent 200 v.
$Q_1$ QUADRAC device, 5 amp 200 v. with 43 v. logic device*
$Q_2$ QUADRAC device, 5 amp 200 V without logic device*
$S_1$ line switch ganged with potentiometer $R_3$

*QUADRAC is a trademark of Electronic Control Corporation and the devices are available as 2003 for $Q_2$ and 2005T for $Q_1$ from the corporation at the address noted hereafter.

The operation of the circuit of FIG. 2 is substantially identical to the operation of the circuit depicted in FIG. 1. The resistor $R_1$ and resistor $R_2$ and capacitor $C_1$ afford a phase shift to sharpen up the timing of the conduction angle. Resistors $R_5$ and $R_6$ operate as one. The diode $D_1$ in conjunction with resistor $R_7$ affords bilateral matching for the circuit.

Considering FIG. 3, the power control circuit of the invention for operation with an induction motor will be described. A pair of contacts 1 and 2, suitable for coupling the circuit to an AC power line source, are connected to lines 3 and 4 of the circuit. A series circuit of current protection resistor $R_9$, potentiometer resistor $R_3$ and timing capacitor $C_2$ is connected between lines 3 and 4. Wiper arm 7 of resistor $R_3$ is connected to the common juncture of resistor $R_9$ and resistor $R_3$. A series circuit of resistor $R_{11}$ and the impedance appearing between anode AE and cathode KE of Impedance Element $Q_2$ is connnected between resistor $R_3$ and line 4. A matching resistor $R_{10}$ shunts the series circuit of resistor $R_{11}$ and Impedance Element $Q_2$. Impedance Element $Q_2$ has a control electrode GE which is coupled by feedback resistors $R_{12}$ to line 5. An induction motor IM is connected onto the circuit between line 4 and line 5, thus the induction motor IM is in a parallel circuit with the cathode KE to control electrode GE of Impedance Element $Q_2$ and resistor $R_{12}$. The bilateral solid state power switch $Q_1$ is connected at its anode A directly to line 3. The cathode K of power switch $Q_1$ is connected directly to line 5, hence, the juncture of resistor $R_{12}$ and induction motor IM. The control electrode G of power switch $Q_1$ is coupled to timing capacitor $C_2$ by bilateral trigger diode T.

In the induction motor circuit of the invention, the Impedance Element (reactive feedback element) is in parallel circuit relation to the timing capacitor and consequently current in the timing capacitor branch of the parallel circuit varies depending on the impedance, hence, current in the Impedance Element branch of the parallel circuit.

Figure 3:
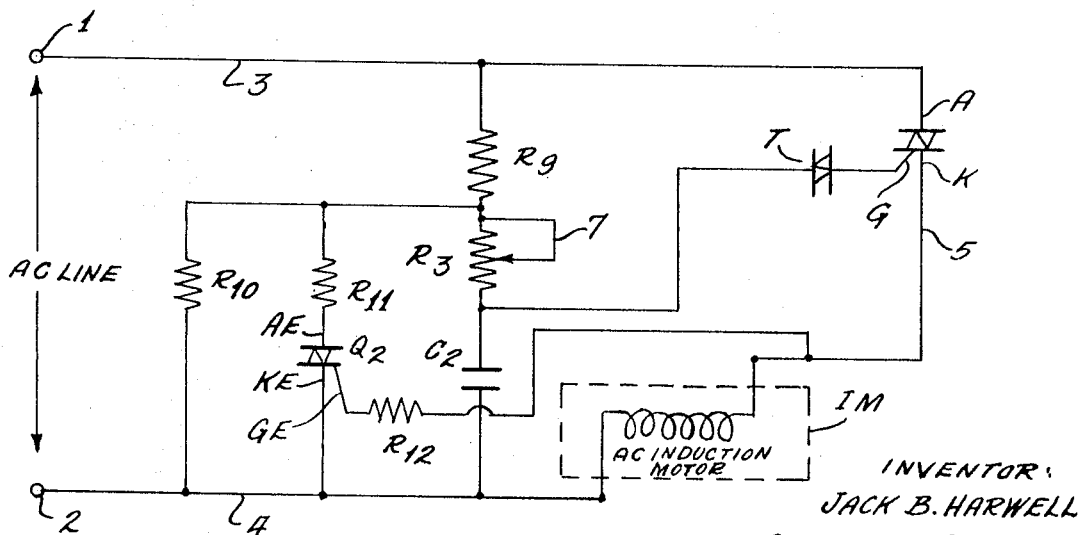
FIG. 3 illustrates a typical circuit application of the invention as applied to an induction motor.

As depicted in FIG. 3, the operation of the induction motor IM control circuit is quite similar to that of the universal motor M circuits of FIGS. 1 and 2, but with several differences. The induction motor IM is in the cathode circuit rather than in the anode circuit, hence, the Impedance Element $Q_2$ is in parallel with the timing capacitor rather than in the charging impedance network. It will be observed that the residual voltage across the induction motor IM provides the desired feedback to vary the impedance across the Impedance Element $Q_2$.

Figure 4:
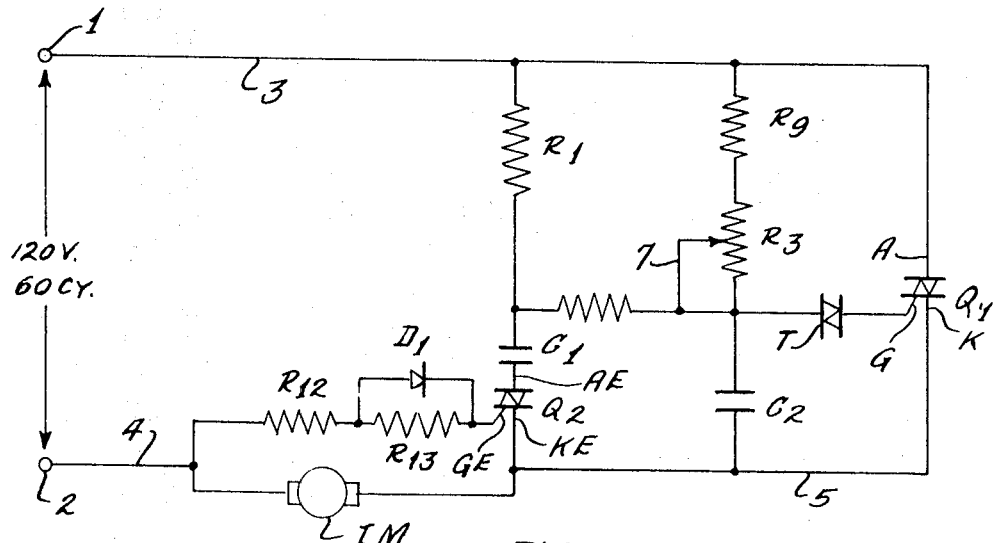
FIG. 4 is a schematic of another circuit application of the invention as applied to an induction motor.

Considering FIG. 4, the circuit depicted was actually utilized to control an induction motor. The circuit includes a pair of contacts 1 and 2, suitable for coupling the circuit to a source of AC line power, are connected to lines 3 and 4, respectively. The anode A of a bilateral solid state power control switch $Q_1$ is connected directly to line 3. An induction motor IM is connected between line 4 and the cathode K of power switch $Q_1$ by line 5. A series phase shift circuit, comprising resistor $R_1$ connected to line 3 and in series with capacitor $C_1$, is connected to the anode AE of Impedance Element $Q_{2\,2}$. The cathode KE of Impedance Element $Q_2$ is coupled to the juncture of line 5 and motor IM. The control element GE of Impedance Element $Q_2$ is connected through the parallel circuit of resistor $R_{13}$ and matching diode $D_1$ in series with feedback resistor $R_{12}$ to the juncture of line 4 and motor IM.

The timing capacitor $C_2$ is connected to line 5 and through potentiometer resistor $R_3$ by current protecting resistor $R_9$ to line 3. The wiper arm 7 of resistor $R_3$ is connected to the juncture of resistor $R_3$ with capacitor $C_2$. A current limiting resistor $R_2$ connects the phase shift network to the juncture of resistor $R_3$ and capacitor $C_2$. The timing capacitor $C_2$ is coupled by bilateral trigger diode T to the control electrode G of power switch $Q_1$.

Considering the operation of the power control circuit of FIG. 4, it will be observed that again the Impedance Element $Q_2$ is in parallel circuit relation with timing capacitor $C_2$, and consequently, current in the timing capacitor branch of the parallel circuit varies depending on impedance, hence, current in the Impedance Element branch of the parallel circuit.

The components used in the circuit of FIG. 4 to control induction motor IM (Nutone Model AK4K36A, 115 v., 60 cycle, 1.1 amps) are listed hereafter:

$R_1$ resistor, carbon, 27 K 10 percent ½ watt
$R_2$ resistor, carbon, 10 K 10 percent ½ watt
$R_3$ potentiometer, carbon, 250 K 30 percent 2 watt
$R_9$ resistor, carbon, 8 K 10 percent ½ watt
$R_{12}$ resistor, carbon, 3.4 K 10 percent 5 watt
$R_{13}$ resistor, carbon, 3 K 10 percent ½ watt
$C_1$ capacitor, paper 0.1 uf 20 percent 200 v.
$C_2$ capacitor, paper 0.1 uf 20 percent 200 v.
$D_1$ diode, silicon, 200 V. PIV v.
T diode, logic device part of $Q_1$
$Q_1$ QUADRAC device, 5 amp 200 v. with 43 v. logic device*
$Q_2$ QUADRAC device, 5 amp 200 V*

*QUADRAC is a trademark of Electronic Control Corporation and the devices are available as 2003 for $Q_2$ and 2005T for $Q_1$ from the corporation at the address noted hereafter.

Figure 5:
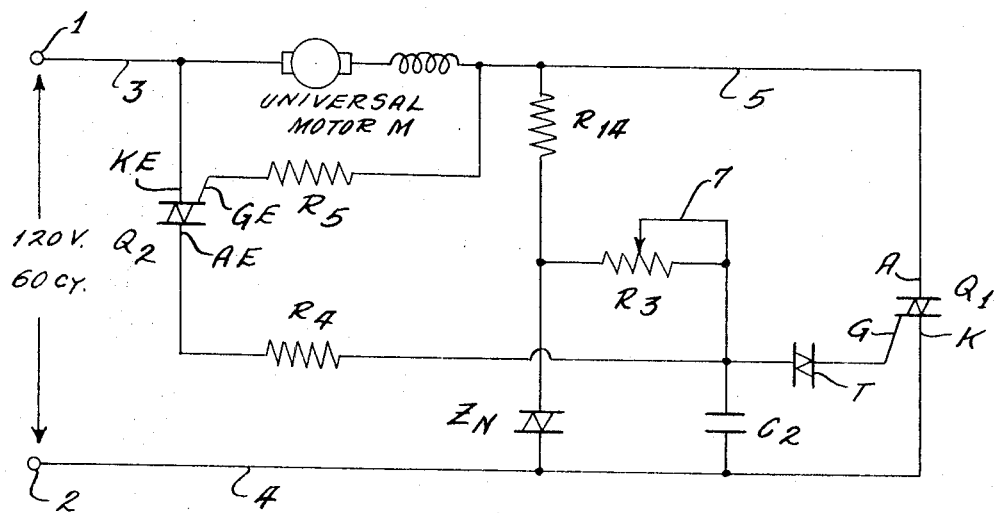
FIG. 5 is a schematic of the invention as applied in a circuit having power line compensation.

Referring now to FIG. 5, the circuit therein depicts the invention utilized in conjunction with automatic AC power line compensation. The circuit includes contacts 1 and 2, for coupling the circuit to a suitable source of AC line power, connected to lines 3 and 4, respectively. The bilateral solid state power control switch $Q_1$ is connected to line 4 at cathode K of the power switch $Q_1$. Anode A of power switch $Q_1$ is connected by line 5 to one side of universal motor M, the other side of motor M being connected to line 3. The AC power line compensation in the circuit is afforded by the series circuits of resistor $R_{14}$ connected to line 5 and negative impedance device $Z_N$ connected to line 4. The device $Z_N$ may be any of the well know bilateral trigger diodes such as are generally used to trigger gated power control switches which are sometimes referred to as break back trigger diodes. The negative impedance device $Z_N$ suitable for application in this circuit may be obtained, from among others, by ordering a line compensating negative impedance trigger diode from Electronic Control Corporation, Euless, Texas, 76039. The timing capacitor $C_2$ is connected to line 4 and through potentiometer resistor $R_3$ to the juncture of resistor $R_{14}$ and negative impedance device $Z_N$. Wiper arm 7 of resistor $R_3$ is connected to the common connection of resistor $R_3$ and capacitor $C_2$.

The feedback Impedance Element $Q_2$ is connected at the cathode KE thereof to line 3 and anode AE of Impedance Element $Q_2$ is coupled to the juncture of timing capacitor $C_2$ and resistor $R_3$ by resistor $R_4$. The juncture of line 5 and motor M is connected to the control electrode GE of Impedance Element $Q_2$ be feedback resistor $R_5$. Timing capacitor $C_2$ is coupled to the control electrode G of power switch $Q_1$ by bilateral trigger diode T.

In operation of the circuit depicted in FIG. 5, with line voltage high the negative impedance device $Z_N$ effects a slower charging rate of capacitor $C_2$ and with line voltage low the device $Z_N$ effects a faster charging rate of capacitor $C_2$. In this manner the average load power remains constant regardless of high or low power line voltage. Whenever the motor load increases or decreases, the change is reflected in the feedback as an impedance change across Impedance Element $Q_2$. Consequently, since Impedance Element $Q_2$ affords part of the charging path impedance for timing capacitor $C_2$, the charging rate of timing capacitor $C_2$ increases or decreases thereby effecting an advancement or retardation of the conduction angle of power switch $Q_1$.

Considering the foregoing, it will be appreciated that the feedback Impedance Element is either part of the charging impedance for the timing capacitor of the universal motor power control circuits, or in parallel circuit relation with the timing capacitor of induction motor power control circuits; consequently, the universal motor is in the anode circuit and the induction motor is in the cathode circuit of the power control switch as herein described.

From the foregoing it will be appreciated that various Impedance Elements are available and various embodiments of the invention will become readily apparent, and all such suggested and apparent changes and modifications are within the scope of the invention which is limited only as necessitated by the scope of the appended claims.

I claim:

1. An AC power control circuit for a reactive power load comprising:
   a. a power control switch having a pair of power electrodes and a control electrode,
   b. a reactive power load in series with said pair of power electrodes,
   c. a feedback impedance means, and
   d. a timing circuit for said power control switch in parallel circuit relation with said reactive power load and pair of power electrodes, said timing circuit including;
      i. an Impedance Element having at least a portion thereof in series with said feedback impedance means and in parallel circuit relation with said reactive power load exhibiting impedance variations inversely responsive to apparent impedance changes of said reactive power load, and
      ii. timing means coupled to said control electrode to activate said power control switch with advancement or retardation of the conduction angle thereof according to the impedance changes of said Impedance Element.

2. The circuit of claim 1 wherein said Impedance Element comprises a bilateral semiconductor switch or parallel inverse silicon controlled rectifiers or transistor means or current gain device.

3. The circuit of claim 1 wherein said Impedance Element comprises a bilateral semiconductor switch and said power control switch comprises a bilateral semiconductor power switch.

4. An AC power control circuit for a reactive impedance load comprising:
   a. A power control switch having a pair of power electrodes and a control electrode,
   b. a reactive impedance load coupled in series with the power electrodes of said power control switch,
   c. an Impedance Element,
   d. a timing circuit, including said Impedance Element, for said power control switch coupled in parallel circuit relation with the reactive impedance load and power switch for controlling the conduction angle of the power control switch, and
   e. feedback impedance means coupling said reactive impedance load into said timing circuit in parallel circuit relation with at least a portion of said Impedance Element whereby changes in said reactive impedance load inversely effects advancement or retardation of the conduction angle.

5. The circuit of claim 4 wherein said timing circuit includes a selectible resistance network, a capacitive reactance network, said capacitive reactance network coupled to the control electrode of said power control switch, a negative impedance device in parallel circuit relation with said capacitive reactance network to compensate said timing circuit for AC power line variations, and said reactive impedance load is a motor.

6. The circuit of claim 5 wherein said motor is a universal motor and said Impedance Element is in series circuit relation with said capacitive reactance network.

7. The circuit of claim 5 wherein said motor is an induction motor and said Impedance Element is in parallel circuit relation with said capacitive reactance network.

8. An AC power control circuit for a reactive impedance load comprising:
 a. a bilateral power control switch,
 b. a reactive impedance load coupled in series with said power control switch,
 c. an Impedance Element,
 d. a timing circuit, including said Impedance Element, for said power control switch coupled in parallel circuit relation with the reactive impedance load and power control switch for controlling the conduction angle of the power control switch,
 e. a feedback impedance means in series circuit relation with at least a portion of said Impedance Element,
 f. said feedback impedance means and said at least a portion of said Impedance Element coupled in shunt circuit relation with said reactive impedance load whereby said Impedance Element exhibits impedance changes inversely responsive to changes in said reactive impedance load effecting correlative advancement or retardation of the conduction angle of the power control switch.

9. An AC power control circuit for a reactive power load comprising:
 a. a power control switch having a pair of power electrodes and a control electrode,
 b. a reactive power load in series with said pair of power electrodes,
 c. a feedback impedance means, and
 d. a timing circuit for said power control switch in parallel circuit relation with said reactive power load and pair of power electrodes, said timing circuit having;
  i. a charging impedance means including,
   A. an Impedance Element, at least a portion of said Impedance Element being in series with said feedback impedance means,
   B. said at least a portion of said Impedance Element and said feedback impedance means in shunt circuit relation with said reactive power load, and
   C. said charging impedance means exhibiting impedance variations inversely responsive to apparent impedance changes of said reactive power load, and
  ii. timing means coupled to said control electrode to activate said power control switch with conduction angle advancement or retardation correlative with impedance changes of said charging impedance means.

10. The circuit of claim 9 wherein said reactive power load comprises a universal motor.

11. The circuit of claim 10 wherein said Impedance Element is in series circuit relation with said timing means.

12. The circuit of claim 9 wherein said reactive power load comprises an induction motor.

13. The circuit of claim 12 wherein said Impedance Element is in parallel circuit relation with said timing means.